United States Patent [19]

Graser et al.

[11] 4,451,654

[45] May 29, 1984

[54] CONDITIONING OF FINELY DIVIDED CRUDE ORGANIC PIGMENTS

[75] Inventors: Fritz Graser, Ludwigshafen; Gerhard Wickenhaeuser, Birkenheide, both of Fed. Rep. of Germany

[73] Assignee: BASF Aktiengesellschaft, Ludwigshafen, Fed. Rep. of Germany

[21] Appl. No.: 380,042

[22] Filed: Sep. 20, 1982

Related U.S. Application Data

[63] Continuation of Ser. No. 240,947, Mar. 5, 1981, abandoned.

[51] Int. Cl.³ ............... C09B 47/04; C09B 47/30
[52] U.S. Cl. ....................... 546/34; 106/309; 260/208; 260/245.86; 260/245.87; 260/369; 546/49; 546/73; 548/457; 549/52; 568/368
[58] Field of Search ............ 260/208, 369, 245.86, 260/245.87; 106/309; 546/34, 49, 73; 548/457; 549/52; 568/368

[56] References Cited

U.S. PATENT DOCUMENTS

| | | | |
|---|---|---|---|
| 2,857,400 | 10/1958 | Cooper et al. | 544/75 |
| 3,150,150 | 9/1984 | Brand | 260/245.87 |
| 3,730,750 | 5/1973 | Fabian | 106/309 |
| 4,104,276 | 8/1978 | Kranz et al. | 260/242.2 X |
| 4,145,182 | 3/1979 | Opitz et al. | 8/39 R |
| 4,224,222 | 9/1980 | Spietschka et al. | 260/245.82 |
| 4,298,526 | 11/1981 | Sappok et al. | 260/245.82 X |
| 4,370,270 | 1/1983 | Bock et al. | 260/245.87 |

FOREIGN PATENT DOCUMENTS

| | | |
|---|---|---|
| 1225598 | 9/1966 | Fed. Rep. of Germany . |
| 1261106 | 2/1968 | Fed. Rep. of Germany . |
| 2341795 | 2/1974 | Fed. Rep. of Germany . |
| 1062256 | 3/1967 | United Kingdom . |

*Primary Examiner*—Richard Raymond
*Attorney, Agent, or Firm*—Oblon, Fisher, Spivak, McClelland & Maier

[57] ABSTRACT

A process for the preparation of deeply colored organic pigments by crystallizing finely divided crude organic pigments, whose primary particles have a size of $\leq 0.2$ μm, in $C_3-C_5$-alkanes, $C_3-C_5$-alkenes or $C_1-C_3$-chloroalkanes at from 40° to 250° C. to under atmospheric pressure or superatmospheric pressure, and isolating the pigment.

The pigments obtained by the process give deep, brilliant colorations.

3 Claims, No Drawings

CONDITIONING OF FINELY DIVIDED CRUDE ORGANIC PIGMENTS

This is a continuation of application Ser. No. 240,947, filed Mar. 5, 1981, now abandoned.

The invention relates to a process for conditioning agglomerated finely divided crude pigments by means of lower aliphatic hydrocarbons or chlorohydrocarbons.

The synthesis of pigments mostly yields coarse crystals, which are unsuitable for pigmentary applications. These coarse crystals, hereafter also referred to as crude pigment, must first be comminuted and then converted to a suitable crystal shape and size. Comminution is in most cases effected by thorough milling of the crude pigments with or without a grinding aid in suitable mills for example in ball mills. This produces pigment powders which consist of agglomerates, 2–200 $\mu$m in size, which in turn are made up of primary particles of $\leq 0.2$ $\mu$m. In spite of the fineness of the primary particles, these agglomerated pigment powders are as a rule unsuitable for tinctorial use but must first be converted, by recrystallization (also referred to as conditioning), to the optimum particle size for the particular application. The primary comminution of the coarse crude crystals can also be effected by, for example, dissolving in concentrated sulfuric acid and reprecipitating in water. The paste of fine particles, thus obtained, is then converted, as obtained or after drying, into a suitable form for pigmentary use, by conditioning. This conditioning is effected by, for example, treating the very fine pigment particles with a mixture of water and organic solvents, for example alcohols, eg. isobutanol, or amines, eg. $C_2$–$C_8$-amines, or with aromatic hydrocarbons, eg. xylene. After conditioning, the liquids used must be recovered, for economic and ecological reasons. This is mostly done by distillation and/or by, for example, separating the liquid from the water.

It is an object of the present invention to provide a process for recrystallizing (conditioning) finely divided agglomerated crude pigments, which permits simple separation of the treated pigment particles from the treatment agent and efficient recovery of the latter, and which is free from ecological problems and employs inexpensive conditioning agents. It is a further object to provide a process which gives conditioned products having good pigmentary properties.

We have found that these objects are achieved and that agglomerated, finely divided, crude organic pigments, of which the agglomerates, which are 1–200 $\mu$m in size, consist of primary particles of $\leq 0.2$ $\mu$m, can be converted, by recrystallization in hot organic liquids at from 40° to 250° C., into forms very suitable for pigmentary applications, if the organic liquids used are $C_3$–$C_5$-alkanes, $C_3$–$C_5$-alkenes or $C_1$–$C_4$-chloroalkanes, the recrystallization being carried out under superatmospheric pressure, where necessary.

Using the process according to the invention, pigmentary forms which give deep, brilliant and outstandingly fast colorations in surface coatings, printing inks or plastics are obtained.

The process according to the invention has the following advantages over the prior art processes: The liquids used for the recrystallization can be removed easily and completely, and are furthermore very inexpensive. The density of the liquid or of the medium can be varied within wide limits in the supercritical range, ie. at above the critical temperature and at pressures around and above the critical pressure of the liquid in question, by employing appropriate pressures. Accordingly, optimum conditions for the recrystallization or conditioning can be set up. Furthermore, the organic liquids used according to the invention present virtually no ecological problems.

Specific examples of $C_3$–$C_5$-alkanes and $C_3$–$C_5$-alkenes are propane, n-butane, n-pentane, 2-methylpropane, 2-methylbutane, 2,2-dimethylpropane, propylene, but-1-ene, but-2-ene, isobutylene, 2-methylbutene, pent-1-ene and 2,2-dimethylpropylene. Examples of suitable $C_1$–$C_4$-chloroalkanes are methyl chloride, methylene chloride, ethyl chloride, propyl chloride and butyl chloride.

The following have proved particularly suitable: the $C_3$–$C_5$-alkanes, the $C_3$–$C_5$-alkenes and the $C_1$–$C_3$-chloroalkanes, eg. propane, butane, pentane; propylene, but-1-ene and pent-1-ene; ethyl chloride, propyl chloride and methyl chloride. Accordingly, these liquids are preferred.

Examples of organic crude pigments to which the process according to the invention is applicable are those derived from phthalocyanine, from anthraquinone, from perylenetetracarboxylic acid diimide, from quinophthalone, from indanthrone, from pyranthrone, from flavanthrone, from violanthrone, from isoviolanthrone, from quinacridone, from thioindigo and from indigo. Crude pigments of the oxazine, isoindoline and azo series are also amenable to the process.

The process according to the invention is in general carried out by suspending the finely divided, agglomerated crude pigment, whose primary particles have a size of $\leq 0.2$ $\mu$m, preferably in a dry or dried form, in the liquid and keeping the mixture at from 40° to 250° C., preferably from 50° to 200° C., until optimum recrystallization has occurred. This in general requires from 0.2 to 10 hours, depending on the pigment, the liquid and the temperature. Because of the low boiling points of the liquids to be used according to the invention, the recrystallization is as a rule carried out under pressure so that it can also be carried out above the temperature corresponding to the boiling point under atmospheric pressure. In the case of certain liquids, the latter can also be brought into the supercritical range and serve as the conditioning medium in this state. Advantageously, the density range employed in such cases is above the critical density. When the pigment has acquired the desired pigmentary form, the liquid is distilled off and collected for re-use. It is also possible to force the conditioning mixture through a valve by means of an inert gas, for example, nitrogen, and to isolate the pigment by a type of spray drying. Where appropriate and desired, the liquid can also be separated from the pigment by filtration. Where necessary, residual adhering traces of liquid are removed by applying slightly reduced pressure. The process of isolation yields the pigment as a dry material, which can be used as a powder, either direct or after milling.

In choosing the liquid to be used, it is necessary to ensure that it does not react with the pigment to be recrystallized. For example, in the case of pigments containing amino groups, which might react with alkyl halides, the alkanes or alkenes, which under the conditions employed do not undergo any chemical reaction, are used as the conditioning medium.

The Examples which follow illustrate the process. Parts and percentages are by weight. Parts by volume bear the same relation to parts by weight as the liter to the kilogram.

EXAMPLE 1

(a) 40 parts of finely milled copper phthalocyanine, which has been obtained as described under (b), and 300 parts of n-pentane are stirred for 6 hours at 90° C. and about 5 bar. The n-pentane is then distilled off, slightly reduced pressure being applied toward the end of the distillation. A dry pigment which consists of finely divided copper phthalocyanine in the β-modification and gives brilliant deep colorations is obtained in quantitative yield.

Instead of removing the n-pentane from the suspension by distillation, the suspension can be filtered at room temperature, for example 25° C. The filter residue is freed from residual n-pentane under reduced pressure. The resulting pigment has the same properties as that obtained in the preceding paragraph.

(b) Crude copper phthalocyanine is milled in a ball mill for 30 hours, in the absence of a grinding aid. The milled material consists of 2–200 μm agglomerates, made up of primary particles of <0.1 μm.

EXAMPLE 2

If the procedure described in the first paragraph of Example 1 is followed, but using n-but-1-ene in place of n-pentane, at 60° C. and under a pressure of about 8 bar, a quantitative yield of a very finely divided copper phthalocyanine, in the β-modification, which gives deep brilliant hues in baked finishes, is obtained.

EXAMPLE 3

40 parts of finely milled copper phthalocyanine, obtained as described in Example 1(b), are stirred in 200 parts of propane in a pressure vessel at 100° C. and about 70 bar for 4 hours. The gas is then released and the mixture cooled to room temperature. A quantitative yield of a very finely divided copper phthalocyanine, in the β-modification, which gives very deep brilliant hues in baked finishes, is obtained.

EXAMPLE 4

(a) 20 parts of finely milled flavanthrone, obtained as described under (b), are stirred with 200 parts of n-butyl chloride in a pressure vessel at 180° C. and 12 bar for 6 hours. The butyl chloride is the released or distilled off, toward the end under slightly reduced pressure, whilst allowing the mixture to cool. A quantitative yield of a finely divided flavanthrone pigment, which gives deep pure yellow high-hiding colorations in surface coatings is obtained.

(b) Crude flavanthrone is milled in a planetary ball mill, in the absence of a grinding aid, for 7 hours. The finished mill base consists of 1–100 μm agglomerates, made up of primary particles of ≦0.1 μm.

EXAMPLE 5

If the procedure described in Example 4(a) is followed, but using 200 parts of n-butane instead of butyl chloride and heating for 6 hours at 190° C. (resulting in a pressure of about 70 bar), a finely divided flavanthrone pigment having similar properties to that of Example 4 is obtained.

EXAMPLE 6

(a) 30 parts of finely milled pyranthrone, obtained as described under (b), are stirred with 200 parts of butyl chloride in a pressure vessel for 6 hours at from 160° to 170° C. under a pressure of from about 8 to 10 bar. After filtering at 50° C., and drying the residue by distillation under reduced pressure, a quantitative yield of a finely divided pigment which gives deep pure reddish yellow colorations in baked finishes is obtained.

(b) Crude pyranthrone prepared as described in German Published Application DAS No. 2,115,131, Example 28, is milled in a planetary ball mill, in the absence of a grinding aid, for 8 hours. The finished mill base consists of 1–100 μm agglomerates, made up of primary particles of ≦0.2 μm.

EXAMPLE 7

(a) 20 parts of finely milled indanthrone, obtained as described under (b), in 200 parts of n-pentane are heated to 185° C. in a stirred pressure vessel and kept at this temperature for 6 hours. The pressure is about 50 bar. The pentane is allowed to distil off whilst the mixture cools to 30° C., toward the end under slightly reduced pressure, and a finely divided indanthrone pigment, which gives deep pure blue baked finishes, is obtained as the residue, in quantitative yield.

(b) Crude indanthrone is milled for 30 hours in a ball mill, in the absence of a grinding aid. A finished mill base whose 1–100 μm agglomerates consist of primary particles of ≦0.2 μm is obtained.

EXAMPLE 8

(a) 20 parts of the finely milled quinophthalone obtained as described in (b), in 200 parts of propane, are heated in a stirred pressure vessel to 80° C., resulting in a pressure of about 35 bar, and are stirred at this temperature for 6 hours. The propane is then distilled off whilst the mixture cools to room temperature, and a quantitative yield of a finely divided quinophthalone pigment, which in a baking finish gives deep brilliant yellow colorations of high transparency, is obtained.

(b) Crude 8-(tetrachlorophthalimido)-tetrachloroquinophthalone, prepared as described in German Published Application DAS No. 1,770,960, is milled for 30 hours in a ball mill, without addition of a grinding aid. A finished mill base whose 1.20 μm agglomerates consist of primary particles of <0.1 μm is obtained.

EXAMPLE 9

If the procedure described in Example 8(a) is followed, but using methyl chloride instead of propane, a similar pigment is obtained. The pressure during conditioning is about 22 bar.

EXAMPLE 10

If the procedure described in Example 8(a) is followed, but using n-butyl chloride instead of propane, and the mixture is heated to 180° C. under a pressure of about 12 bar, after which the butyl chloride is distilled off until the temperature is about 60° C. and the remainder is then distilled off under reduced pressure, a finely divided quinophthalone pigment is obtained, which gives deep yellow high-hiding colorations in a baking finish.

EXAMPLE 11

(a) 20 parts of perylenetetracarboxylic acid bis-phenylazoanilide, prepared as described in German Pat. No. 1,257,096, Example 1a, followed by reprecipitation from concentrated sulfuric acid, washing neutral and drying the aqueous press cake, are heated, in 200 parts of n-butyl chloride, in a stirred pressure vessel to 180° C. resulting in a pressure of about 12 bar, and are kept at this temperature for 6 hours. After distilling off the butyl chloride, in the course of which the temperature is allowed to drop to about 60° C. and reduced pressure is then applied, a finely divided perylene pigment is obtained, which gives deep pure red high-hiding baked finishes.

Similar results are obtained if instead of butyl chloride n-pentane at 185° C. is used. The pressure during conditioning is about 50 bar. When distilling off the n-pentane, the temperature is allowed to drop to about 30° C. before applying reduced pressure.

EXAMPLE 12

70 parts of finely milled copper phthalocyanine (prepared as described in Example 1(b)) are mixed with 420 parts of liquid methyl chloride (under about 9 bar) at 20° C. in a stirred pressure vessel of capacity 1,200 parts by volume. The mixture is then heated to 80° C. in the course of about 10 minutes, resulting in a pressure of 25 bar, and is stirred at 80° C. for 4 hours. The suspension is then slowly forced through a choker valve by means of nitrogen, the pressure being released as the material issues from the valve. The methyl chloride escapes as gas and is separated from the copper phthalocyanine by passage through a filter. An excellent yield of a very finely divided copper phthalocyanine pigment, which gives brilliant deep colorations and is very easily dispersible, is obtained.

EXAMPLE 13

70 parts of finely milled copper phthalocyanine are mixed, as described in Example 12, with 420 parts of liquid methyl chloride, and the mixture is then heated to 150° C. in the course of about 15 minutes, resulting in a pressure of 78 bar, and is stirred for 30 minutes at 150°–155° C. It is then cooled to 80° C. and the suspension is worked up, as described in Example 12, by releasing it through a choker valve. An excellent yield of a copper phthalocyanine pigment, having virtually the same properties as that of Example 12, is obtained.

EXAMPLE 14

70 parts of finely milled copper phthalocyanine (obtained as described in Example 1(b)) are mixed with 420 parts of liquid ethyl chloride (under about 5 bar) at 20° C. in a stirred pressure vessel of 1,200 parts by volume capacity; the mixture is then heated to 100° C. in the course of about 10 minutes, resulting in a pressure of 12 bar, and is stirred for 4 hours at 100° C. The suspension is then forced by means of nitrogen, under a constant pressure of 12 bar, through a flow-through heater, where it is quickly heated to 150°–155° C., and is slowly released through a choker valve. The ethyl chloride escapes, as gas, into an exhaust unit and is separated from the copper phthalocyanine by means of a filter. An excellent yield of a very finely divided copper phthalocyanine pigment, which gives brilliant deep colorations and is very easily dispersible, is obtained.

EXAMPLE 15

70 parts of finely milled copper phthalocyanine are mixed with 420 parts of liquid ethyl chloride as described in Example 14. The mixture is then heated to 100° C. in the course of about 10 minutes, resulting in a pressure of 12 bar, and is stirred at this temperature and pressure for a further 15 minutes. The suspension is then forced by means of nitrogen, under a constant pressure of 12 bar, through a flow-through heater, where it is quickly heated to 180°–185° C., and is released through a choker valve. The copper phthalocyanine is separated from the gaseous ethyl chloride by means of a filter, and is isolated, the ethyl chloride being taken up in an exhaust unit. An excellent yield of a very finely divided copper phthalocyanine pigment, which gives brilliant deep colorations and is very easily dispersible, is obtained.

If instead of 70 parts, 140 parts of finely milled copper phthalocyanine are used and in other respects the procedure described above is followed, a copper phthalocyanine pigment having very similar properties is obtained.

After liquefaction, the ethyl chloride can be re-used.

EXAMPLE 16

70 parts of finely milled copper phthalocyanine (prepared as described in Example 1(b)) are stirred with 420 parts of n-propyl chloride at 20° C. in a pressure vessel of 1,200 parts by volume capacity, and the mixture is heated, with the vessel closed pressure-tight, to 100° C. in the course of about 10 minutes, resulting in a pressure of about 8–9 bar. Stirring is continued for 4 hours at 100° C. The pressure in the vessel is then brought to 55 bar with nitrogen and the suspension is forced, under constant pressure, through a flow-through heater, in which it is rapidly heated to 180°–185° C., and is then immediately released slowly through a choker valve. The propyl chloride escapes, as gas, into an exhaust system and is separated from the copper phthalocyanine pigment by means of a filter.

An excellent yield of a finely divided copper phthalocyanine pigment, which gives very pure deep colorations and is very easily dispersible, is obtained.

EXAMPLE 17

70 parts of finely milled copper phthalocyanine (prepared as described in Example 1(b)) are stirred with 420 parts of n-butyl chloride in a pressure vessel (1,200 parts by volume capacity) at 20° C., and the mixture is heated, with the vessel closed pressure-tight, to 100° C. in the course of 10 minutes, resulting in a pressure of about 8 bar. Stirring is continued for 4 hours at 100° C. The pressure in the vessel is then brought up to 45 bar with nitrogen and the suspension is forced, under constant pressure, through a flow-through heater, in which it is rapidly heated to 180°–185° C., and is then immediately released slowly through a choker valve. The greater part of the butyl chloride escapes as gas into an exhaust system and is separated from the copper phthalocyanine by means of a filter. A minor part of the butyl chloride precipitates as liquid on the copper phthalocyanine pigment and moistens it, but can be removed by applying slightly reduced pressure. A very good yield of a copper phthalocyanine pigment is obtained in the form of lumps which can easily be crushed; the pigment gives deep colorations and is very easily dispersible.

EXAMPLE 18

70 parts of finely milled copper phthalocyanine are mixed with 420 parts of liquid methyl chloride as described in Example 12, but the mixture is heated to 50° C. in the course of 10 minutes, resulting in a pressure of 13 bar, and is then stirred for 4 hours at 50° C. Thereafter it is forced by means of nitrogen, under a constant pressure of 13 bar, through a flow-through heater, in which it is rapidly heated to 150°–155° C., and is released through a choker valve. The methyl chloride escapes as gas and is separated from the copper phthalocyanine by means of a filter. An excellent yield of a very finely divided copper phthalocyanine pigment, which gives brilliant deep colorations and is very easily dispersible, is obtained.

EXAMPLE 19

70 parts of finely milled copper phthalocyanine (prepared as described in Example 1(b)) are mixed with 420 parts of liquid propane, under 22 bar at 20° C. in a stirred pressure vessel of 1,200 parts by volume capacity, and the mixture is then heated to 120° C. in the course of 15 minutes, resulting in a pressure of about 90 bar, and is stirred at 120° C. for 4 hours. It is then cooled to 80° C. and the propane is released as gas, whilst the mixture continues to cool to room temperature. A quantitative yield of a finely divided copper phthalocyanine pigment, in the $\beta$-modification, which gives deep brilliant colorations in baked finishes, is obtained.

We claim:

1. A process for conditioning a crude organic pigment selected from the group consisting of phthalocyanine pigments, anthraquinone pigments, perylenetetracarboxylic acid diimides, quinophthalone pigments, indanthrone pigments, pyranthrone pigments, flavanthrone pigments, violanthrone pigments, isoviolanthrone pigments, quinacridone pigments, thioindigo pigments and indigo pigments, comprising:
   recrystallizing said pigment as a finely divided material of agglomerates of a size ranging from 1–200 $\mu$m, the primary particles which constitute said agglomerates being of $\leq 0.2$ $\mu$m, in a hot organic liquid selected from the group consisting of a $C_3$–$C_5$-alkane, a $C_3$–$C_5$-alkene and a $C_1$–$C_3$-chloroalkane in the critical or supercritical state up to 250° C.

2. The process of claim 1, wherein the recrystallization of the crude pigment is conducted at a temperature up to 200° C.

3. The process as claimed in claim 1, wherein the organic liquid is propane, butane, pentane, but-1-ene, pent-1-ene, ethyl chloride, methyl chloride or propyl chloride.

* * * * *